United States Patent [19]

Lhuillier et al.

[11] Patent Number: 4,734,195

[45] Date of Patent: Mar. 29, 1988

[54] FILTER CARTRIDGE HAVING A HONEYCOMBED OUTER SURFACE, AND METHOD OF MANUFACTURE

[75] Inventors: Robert Lhuillier, Longpont Sur Orge, France; Michael Selesnick, Nextown, Pa.; Jean Vieville, Antony; John Wolfe, Flancourt Catelon, both of France

[73] Assignee: A.R.E. S.A.R.L., Massy, France

[21] Appl. No.: 855,746

[22] PCT Filed: Jul. 24, 1985

[86] PCT No.: PCT/FR85/00203

§ 371 Date: Mar. 3, 1986

§ 102(e) Date: Mar. 3, 1986

[87] PCT Pub. No.: WO86/00822

PCT Pub. Date: Feb. 13, 1986

[30] Foreign Application Priority Data

Jul. 25, 1984 [FR] France ................................ 84 11801

[51] Int. Cl.$^4$ ............................................. B01D 27/06
[52] U.S. Cl. ................................ 210/493.1; 493/941; 493/966; 210/494.3; 210/497.01; 55/500; 55/521

[58] Field of Search ............... 493/941, 966, 310, 312, 493/405, 451; 210/493.1, 497.01, 497.02, 506, 508, 494.1, 494.3, 493.2, 493.5; 55/500, 521, 524, DIG. 5

[56] References Cited

U.S. PATENT DOCUMENTS

| | | | |
|---|---|---|---|
| 2,790,207 | 4/1957 | Steele et al. | 493/966 |
| 3,025,964 | 3/1962 | Summers et al. | 210/493.5 |
| 3,112,264 | 11/1963 | Bub | 210/493.5 |

FOREIGN PATENT DOCUMENTS

717072 10/1954 United Kingdom ............... 493/966

Primary Examiner—Richard V. Fisher
Assistant Examiner—Wanda L. Millard
Attorney, Agent, or Firm—Gerald J. Ferguson, Jr.; Michael P. Hoffman; Michael J. Foycik, Jr.

[57] ABSTRACT

A filter cartridge of the type made from a sheet of filter paper pleated as an accordion on a cylindrical surface. It is produced by pinching pairs of contiguous pleats at various levels in order to make on the outer surface of the cartridge a plurality of honeycombs. The invention results in substantially prolonged life of the filter cartridges, which have applications in a variety of uses, including regeneration of solvents of washing baths for dry cleaning machines, filtration of air for internal combustion engines and water filtration.

12 Claims, 4 Drawing Figures

FILTER CARTRIDGE HAVING A HONEYCOMBED OUTER SURFACE, AND METHOD OF MANUFACTURE

The present invention relates to manufacturing filter cartridges of the type made from a sheet of filter material, constituted in particular by fibers of resin-impregnated paper which is folded concertina-like round the surface of a cylinder and which has its outer sides received inside two outer supports.

In prior filters of this type, the two main problems currently faced for a given volume and thus an imposed diameter are:

to obtain the maximum effective filter area; and to avoid some of the concertina folds coming into contact with one another.

It will readily be understood that increasing the filter area reduces the headloss across the filter and thus improves the throughput and the quality of the filtering.

However, the above-mentioned two constraints appear, a priori to be contradictory. This is because increasing the filter surface area for given diameter requires the number of folds that are distributed around the cartridge to be increased, and the folds have to be brought closer together.

Of necessity, the outer face of a filter cartridge is the seat of a fluid flow and of a pressure difference. Thus, it is generally observed on conventional filter cartridges that if the folds of the printer sheet are too close together, some of them come together and aglutinate in bunches whereas others move uselessly apart. As a result:

firstly the effective filter surface area is reduced; and secondly those filter folds which remain separated on the cartridge are few in number and are rapidly filled with solid dirt. The headloss increases and the cartridge rapidly becomes unusable.

In the more usual cartridges, the folds are merely held by both ends in two end supports which constitutes the flanks of the cartridge.

The initial outer spacing between the folds is about 0.8 mm.

With these usual cartridges, the bunching phenomenon occurs very soon and is highly marked.

The lifetime of the cartridge is very short because of the maximum quantity of dust which can be retained in the few folds which remain effective.

In order to solve this problem, recent prior art has attempted to provide various methods for:

uniformly distributing the folds of the filter sheet round the side surface of the cartridge; and imposing a minimum distance of about 1 millimeter between adjacent external folds of the cartridge.

A currently implemented first variant consists in crushing the upper periphery of each fold at certain points on the cartridge to increase the width of the fold where crushed and to oblige the folds to stay apart. However, this method does not separate the folds far enough apart. As a result, this method is ineffective.

A second variant, derived from the first, consists in deforming the paper while hot in order to provide its folds with radial ribs which also increase their width and tend to hold them apart. This method ensures an initial degree of uniformity in the fold spacing. However, it is very difficult to implement and requires the use of a special machine. Further, the resulting filter cartridges rapidly lose their mechanical configuration with respect to fold spacing. This is because the hot and chemically difficult environments in which such cartridges operate eliminate the grooves which are hot-formed in the folds. As a result such second variant cartridges return to the defects of conventional cartridges as described above.

Finally, in a third variant filter cartridge an attempt is made to separate the folds uniformly from one another by maintaining them between the successive turns of coil springs, which springs are looped back on themselves and placed on the outer face at different levels all round the cartridge. In this method, the folds are left free except for those places where they are held by the turns of the springs. As a result the bunching phenomenon tends to reoccur between the positions of the springs. To keep the folds apart it is necessary to provide a large number of springs, thereby considerably complicating cartridge manufacture.

Furthermore, the slope of the turns tends to skew the folds relative to the cartridge axis, thereby intensifying fold bunching.

Finally and above all the spring bodies clamp the two sides of each fold against each other, such that the flanks of the folds tend to stick to each other and to make the filter cartridge completely ineffective by reducing its filter surface area to the very small area of the edges of each fold.

The aim of the present invention is to provide an overall solution for the above-mentioned problems.

A first aim of the invention is to provide a new mode of manufacturing filter cartridges offering maximum filtering surface area and fold spacing which is uniformly distributed.

A second aim of the invention is to provide a filter cartridge having increased lifetime.

Finally, a third aim of the invention is to teach several technical solutions for manufacturing a filter cartridge whose folds are separate and uniformly distributed.

The invention consists in an improvement of the prinple of separating folds used in the third variant described above.

The general method of the invention is to form a sheet of filter material in conventional manner into a concertina shape constituted by a series of folds which are parallel to a common, folding, direction and which are of equal depth. The concertina formed in this way is held by its folded outer side edges within two end supports in such a manner as to constitute a filter having an outside face intended to receive a fluid to be filtered by passing through the sheet, and an inside face via which the filtered fluid leaves after passing through the sheet.

The method of the invention seeks, as do the above-described prior techniques, to maintain a minimum spacing between at least some portions of the adjacent outer folds.

However, the invention is remarkable in that the spacing is maintained by configuring the outer folds into a honeycomb configuration.

In order to provide such a honeycomb, at least two adjacent folds of the outer face are clamped together at at least two different heights along the sheet, which heights are separated from one another along the first folding direction. The pairs of folds thus provide two intermediate portions which are face to face between the two clamping points.

Then, the two intermediate positions between the clamping points of the outer adjacent folds are moved apart so as to provide at least one honeycomb cell on the outer face of the filter between the adjacent pair of folds.

Other characteristics and advantages of the invention appear from the following description with reference to the accompanying drawings, with the description and drawings being given by way of non-limiting example.

Figure 1:
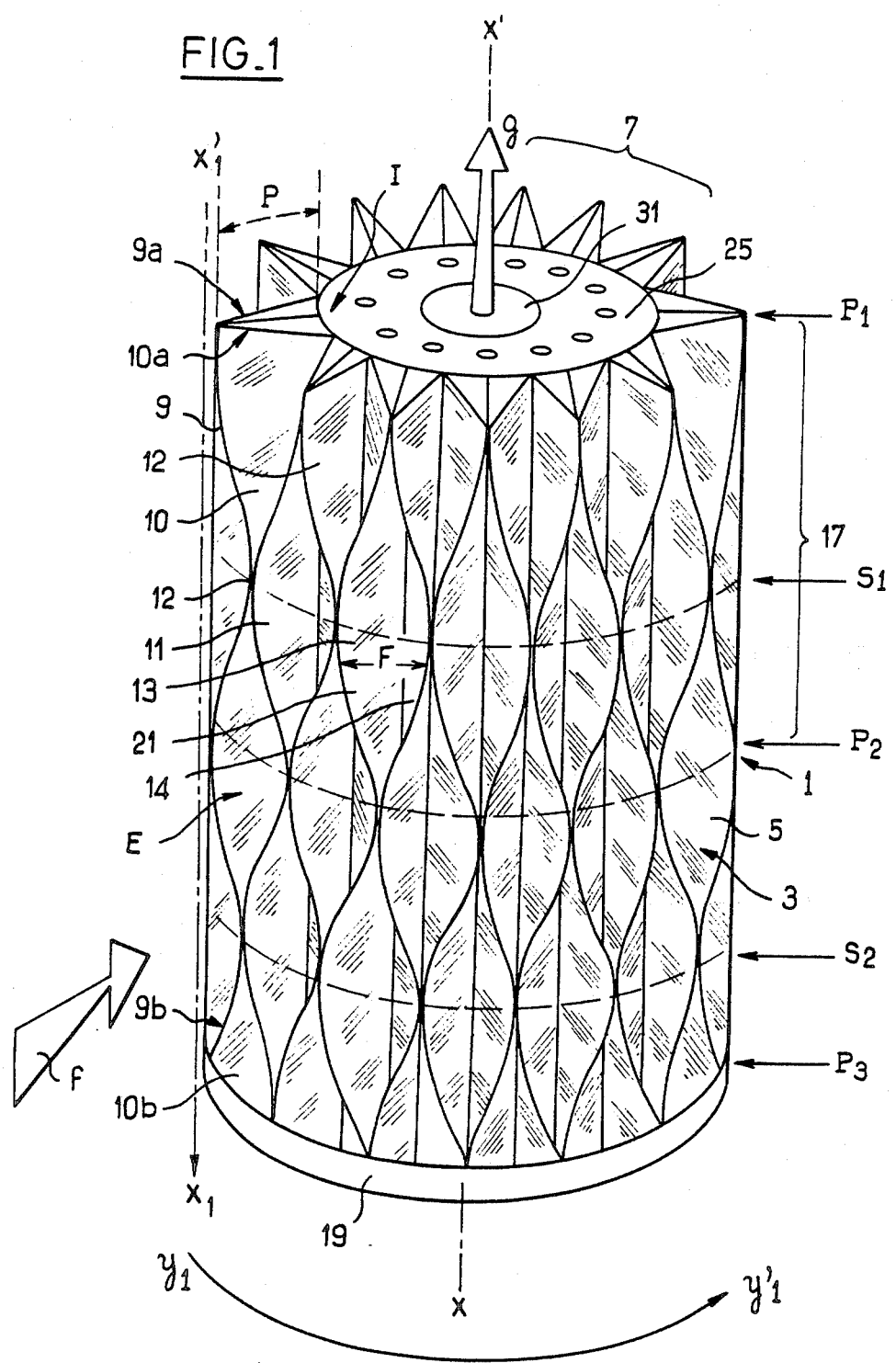
FIG. 1 is a perspective view showing the main characteristics of a filter cartridge in accorance with the invention.

The filter cartridge 1 shown in FIG. 1 is substantially cylindrical in shape. It is mainly constituted by a sheet 3 of filter paper 5. The filter paper 5 is impregnated with a resin to improve its resistance to thermal, chemical, mechanical, and pressure stresses to which it is subjected by the fluid which it filters.

The sheet 3 of paper 5 was initially rectangular in shape. It was then folded into a concertina 7 along a series of folds 9, 10, 11, . . . , initially in a conventional manner with the folds parallel to a first folding direction itself parallel to the axis x,x' of the cartridge.

The depth of each of the folds 9, 10, 11, 12, 13, and 14 is constant. The two longitudinal edges (which are indistinguishable in FIG. 1) of the sheet 1 have been placed side by side so that the sheet constitutes a substantially cylindrical filter block 17. The side edges 9a, 9b, of the folds 9, 10, . . . of the concertina 7 are held in place by being glued inside end metal supports, with only the bottom support 19 being shown since the other support has been removed to show the top portion of the cartridge 1. The function of the metal supports 19 is firstly to ensure that cartridges 1 are rigid and of standard size, and secondly to provide sealing between the downstream portion and the upstream portion of a filter network within which the filter cartridge 1 is to be inserted.

The filter block 17 has an outer surface E which is intended to receive the fluid to be filtered prior to passing through the sheet 3, and an inner surface I through which the fluid leaves after being filtered. An arrow f represents fluid inlet to the outer face E of the filter cartridge.

One of the essential novel features of the invention lies in the structure of the outer surface E of the cartridge which is formed to include a plurality of honeycomb cells 21.

The following procedure is used to achieve this result;

firstly, the folds 9, 10, 11, 12, 13, 14 of the concertina are clamped together at various primary levels p1, p2, p3 at different heights up the sheet 3 to constitute a first partition of pairs of folds P1=(9, 10; 11, 12; . . . ). Each pair 9, 10; 11, 12; . . . in the first partition comprises two adjacent folds in the concertina 7; and secondly, adjacent folds 10, 11; 12, 13; . . . belonging to adjacent pairs of folds in the first partition P1 are likewise clamped together at various secondary levels s1, s2, . . . situated between an adjacent pair of primary clamping levels p1, p2; and p2, p3 respectively, thereby constituting a second partition of pairs of folds P2=(10, 11; 12, 13; . . . ) which is offset relative to the first partition.

Finally, a separating force F is applied between adjacent folds 13, 14 of the first partition P1 in their intermediate portions pi. The folds 13 and 14 are thus separated to provide a plurality of honeycomb cells 21 disposed along a second direction y, y' which is perpendicular to the first or folding direction x, x'.

If the filter cartridge 1 was substantially plane in shape, a recommended way of exerting the separating force F in accordance with the invention would be to exert traction between the longitudinal edges of the sheet 3 along a direction y1, y'1 perpendicular to the folding direction x1, x'1.

However, in order to make a cylindrical filter cartridge 3, the longitudinal edges of the concertina 7 are brought together so as to define a cylinder about the axis x, x'. This cylindrical folding of the sheet and its folds 13, 14 sets up stresses in the outer folds of the concertina which open up the honeycomb cells 21.

A first cylindrical metal grating 25 about the axis x, x' thrusts the insides of the folds in the concertina 7 outwardly.

This disposition compensates for the pressure force transmitted to the sheet 3 by the outer fluid, stiffens the cartridge, and increases the traction phenomenon on the outer folds 9, 10, 11, 12, 13, . . . giving rise to the honeycomb cells 21.

The set of folds 9, 10, 11, 12, 13, . . . of the filter block 17 made in this way constitutes a structure with plenty of static redundancy and incapable of suffering significant mechanical deformation.

A second cylindrical metal grating (not shown) which is coaxial with the first grating but of smaller diameter, and which is of the same height as the cartridge is placed in the center thereof.

The two gratings (not shown) are held in place by the outer metal supports 19. An additional filter compound (not shown) is generally enclosed between the two gratings (not shown), and may be constituted, in particular, by granular activated charcoal and clay.

The cartridge 1 may be used to filter all types of fluid, both liquids and gases.

One of the most advantageous applications of the invention concerns regenerating the solvents in the cleaning baths used in dry cleaning machines.

The earliest method of regeneration used in this application distilled the solvent. However this is both very difficult to implement and extremely expensive.

The Applicant has developed numerous improvements to the techniques of filter regeneration enabling them to take the place completely or partially of distillation methods in this field. These techniques give rise to greater ease of use and to highly advantageous costs. However, they are limited by the relatively short lifetime of the cartridges because of the rapid crushing phenomena mentioned above.

The new filter cartridge proposed by the invention solves these problems. The following filtering method is obtained when the cartridge is used for filtering a fluid constituted by a cleaning bath.

The liquid passes through the sheet 3 substantially radially along f. It splits into a plurality of flow lines which are uniformly distributed around the periphery of the filter and each of which leads into a honeycomb cell 21. Because of the highly varied shape of the cells, each provides an inside volume and a surface area which are fairly large. Insoluble dirt, and in particular dust, is retained by the paper 1 and is deposited uniformly inside each cell 21.

Soluble and very fine dirt passes through the sheet 3 and the first grating 25 but is retained inside the filter compound. The clean regenerated solvent passes through the second grating and escapes outwardly via the inside channel 31.

The essential advantage of the invention lies in the fact that the honeycomb cells 21 are all pulled open and are uniformly distributed. Thus, the filtering area is at a maximum and the volume of dust which can be retained is considerably greater than the volume which can be retained by conventional cartridges.

These dispositions give rise to cartridge lifetimes which are two three times greater and to head losses which are considerably reduced.

The invention also recommends various ways of making the honeycomb cells 21 in the outer face E of the cartridge.

In a first variant, shown in FIG. 1, segments of glue are disposed between the pairs of folds 9, 10; 10, 11; 11, 12; ... at the various levels p1, p2, p3, s1, and s2 where the folds are to be clamped together. The folds are then clamped at the appropriate levels.

A second variant which is similar to the first consists in using the properties of paper 5 which has been impregnated with a polymerizable resin. In this technique, adjacent folds are clamped together at appropriate levels and are hot pressed against one another until the resin has polymerized.

Figure 2:
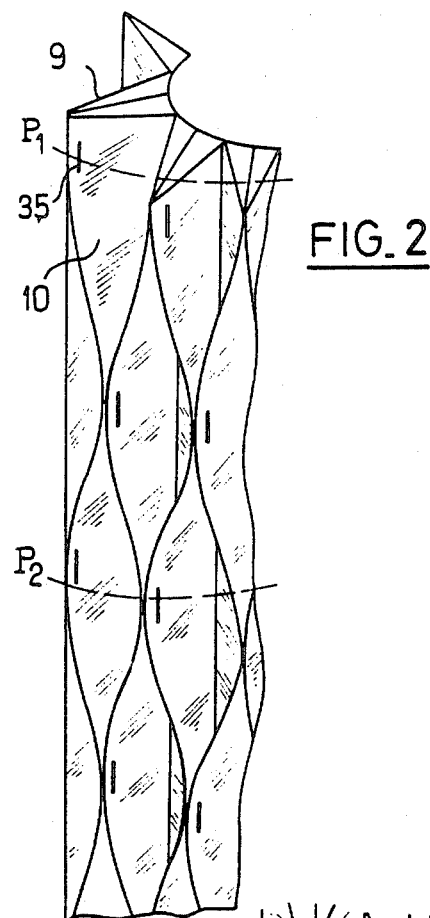
FIG. 2 shows a second embodiment of a honeycomb filter surface obtained by fold stapling.

A third variant is shown in FIG. 2 and consists in clamping adjacent folds against one another by means of staples 35 put through pairs of folds 9, 10, ... to hold them together at appropriate levels p1, p2, ....

Figure 3:
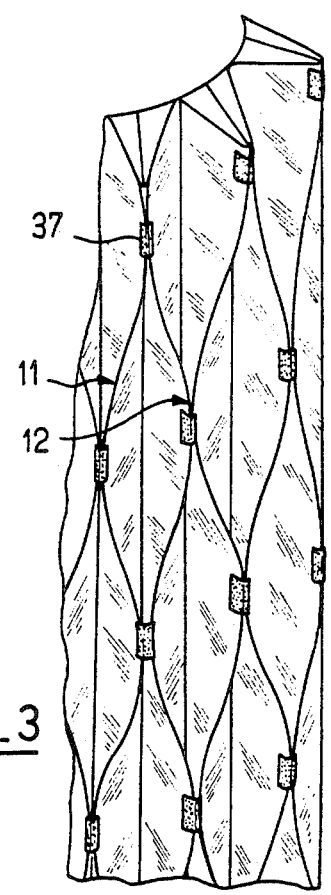
FIG. 3 shows a third implementation of the honeycomb filter surface by fold clipping.
Figure 4:
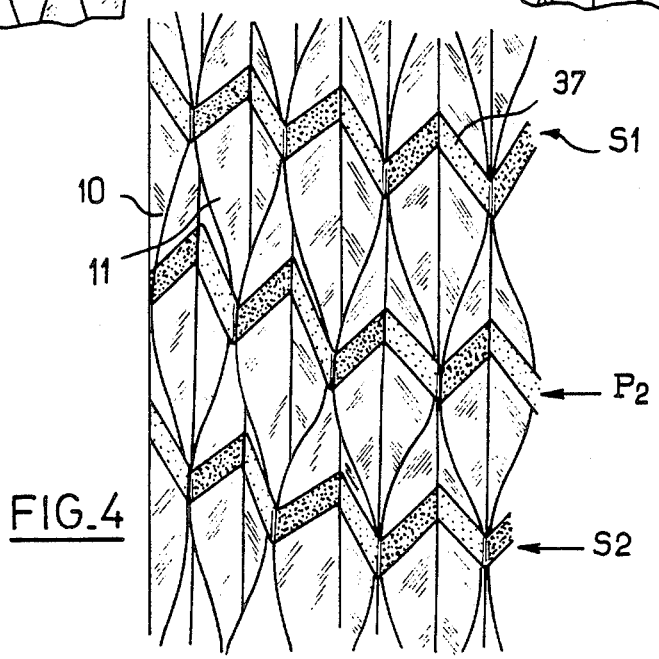
FIG. 4 shows a fourth implementation of the honeycomb filter surface by means of an intermediate metal structure.

A fourth variant shown in FIG. 3 consists in replacing the staples 35 by independent clips 37 which compress the folds 11, 12 from the outside.

Finally, a fifth variant shown in FIG. 5 consists in placing corrugated metal elements 35 around the periphery of the cartridge at the various levels s1, p2, s2 in order to clamp adjacent folds 10, 11 together at the points where they need to be clamped together and to hold them apart elsewhere.

It will readily be understood that the filtering method in accordance with the invention is readily adaptable to filtering any other fluid, and in particular to filtering suspended dust or water from the admission gases to an internal combustion engine.

The invention having been described, and its advantages justified by a detailed example, the Applicants reserve it exclusively to themselves throughout the duration of the patent, without any limitation other than that of the following claims.

We claim:

1. A method of manufacturing a filter (1) from a sheet (3) of filter material (5), constituted in particular by resin-impregnated paper fibers, the method which is intended to increase the efficiency and the lifetime of the filter (1) by increasing and by distributing its filtering surface area consists in particular:

in shaping the sheet (3) concertina-like (7) in a series of folds (9, 10, 11, 12, 13, etc....) which are parallel to a common "folding" direction (x1, x'1) and which are of equal depth;

in holding said concertina (7) by its side edges outside the folds (9, 10, 11, 12, 13, ...) in two end supports in such a manner as to constitute a filter (1) having an outer face (E) via which it is intended to receive the fluid to be filtered (along f), for passing through the sheet (3), and an inner face (I) via which the fluid is to leave after passing through the sheet (3); and in providing at least a minimum separation between at least some portions of adjacent outer folds (9, 10, 11, 12, 13, ...);

said method being characterized by the following combination:

firstly at least two adjacent folds (9, 10), (11, 12), (13, 14) of the outer face are clamped together at at least two levels (p1, p2, p3) at different heights along the sheet (3) in the "folding" direction (x1, x'1) said at least two adjacent folds (9, 10), (11, 12), (13, 14) thus providing facing intermediate portions situated between two clamping points; and secondly said two intermediate portions between said clamping points said at least two adjacent folds (9, 10), (11, 12), (13, 14) are separated so as to provide at least one honeycomb cell (21) in the outer face (E) of the filter (1) between said at least two adjacent folds (9, 10), (11, 12), (13, 14).

2. A method of manufacturing a filter (1) according to above claim 1, from a sheet (3) of concertina-folded filter material (5), intended to create a plurality of honeycomb cells (21) in said outer face (E) of the filter (1), said method being characterized by the following combination:

firstly, adjacent folds (9, 10) of the outer face (E) of the concertina (7) are clamped together in pairs at least two primary levels (p1, p2, p3) at different heights of the sheet (3) to constitute a first partition (p1) of pairs of folds (9, 10), (11, 12), (13, 14);

secondly, adjacent folds (10, 11) belonging to two adjacent pairs of the first partition are clamped together in pairs at a secondary level (s1, s2) situated in the intermediate portion between said two primary clamping levels (p1, p2) to constitute a second partition (p2) of pairs of folds offset relative to the first; and finally, a separating force (F) is exerted between the adjacent folds (13, 14) of the first partition (P1), at least in said intermediate portions, in such a manner as to provide a plurality of honeycomb cells (21) over the outer face of the filter in said intermediate portions which are distributed along a second direction (y1, y'1) perpendicular to said "folding" direction (x1, x'1).

3. A method of manufacturing a filter (1) according to above claim 2, from a sheet (3) of concertina-folded filter material (5), said method being characterized in that the honeycomb cells (21) are opened by maintaining traction (F) perpendicular to said "folding" direction (x1, x'1) between the longitudinal edges of the sheet parallel to said "folding" direction.

4. A method of manufacturing a filter (1) according to above claim 3, from a concertina-folded sheet (3) of filter material (5), said method being characterized in that the honeycomb cell (21) opening traction (F) is exerted by turning said concertina (7) back on itself about a cylinder whose axis (x1, x'1) is parallel to said "folding" direction (x1, x'1).

5. A method of manufacturing a filter (1) according to claim 1, from a sheet (3) of filter material (5), said method being characterized in that adjacent folds (11, 12) are clamped against one another by crushing them using independent clips (37).

6. A method of manufacturing a filter (1) according to claim 1, from a sheet (3) of filter material (5), said method being characterized in that adjacent folds (9, 10) are clamped to one another by means of staples (35) placed through two adjacent folds (9, 10).

7. A method of manufacturing a filter (1) according to claim 1, from a sheet (3) of filter material (5), said method being characterized in that adjacent folds (9, 10) are clamped against one another by placing a spot of glue therebetween.

8. A method of manufacturing a filter (1) according to preceding claim 7, from a sheet (3) of filter material (5) which is impregnated with a polymerizable resin, said method being characterized in that adjacent folds (9, 10) are clamped to one another and are crushed hot against one another until the resin polymerizes.

9. A cylindrical filter cartridge (1) of the type manufactured from a sheet (3) of filter material (5) constituted in particular by resin-impregnated paper fibers and given a concertina (7) shaped having folds (9, 10, 11, 12, 13, 14 . . . ) extending along a first "folding" direction (x1, x'1), with each of said folds (9, 10, 11, 12, 13, 14 . . . ) being of the same depth, two side edges of the sheet parallel to the "folding" direction being held against each other in such a manner as to separate and spread out said folds (9, 10, 11, 12, 13, 14 . . . ) of the filtering concertina (7) around a substantially cylindrical surface about the first direction (x1, x'1), and a cylindrical filter block thus created being held between two ends disks (19), said cylindrical filter cartridge (1) being characterized in that said folds (9, 10, 11, 12, 13, 14 . . . ) are spread out and connected together in pairs in such a manner as to provide a plurality of honeycomb cells (21) in an outer face (E) of said folds 9, 10, 11, 12, 13, 14 . . . ).

10. A cylindrical filter cartridge (1) according to above claim 9, said filter cartriage (11) being characterized in that:
said folds (9, 10, 11, 12, 13, 14 . . . ) of said cartridge (1) are distributed into a first partition (P1) and a second partition (P2) of pairs of adjacent folds, said first partition (P1) and said second partition (P2) being shifted relative to each other by one fold;
with said first partition (P1) having adjacent outer folds of said concertina (7) being clamped together in pairs at a plurality of primary levels (p1, p2, p3) distributed at substantially equidistant heights along the cartridge (1) and leaving intermediate portions therebetween; and
with said second partition (P2) which is shifted by one fold relative to said first partition (P1) having adjacent outer folds (10, 11, 12, 13) of the concertina (7) constituting two adjacent faces in said first partition (P1) being clamped together in pairs in a series of secondary levels (s1, s2, . . . ) which are situated substantially in the middles of said intermediate portions between the primary levels (p1, p2, p3) of said concertina (7).

11. A cylindrical filter cartridge (1) according to above claim 10, characterized in that some of said adjacent outer folds of said concertina (7) are clamped together by independent clamping means.

12. A cylindrical filter cartridge (1) according to above claim 10, characterized in that some of said adjacent outer folds of said concertina (7) are clamped together by gluing.

* * * * *